(12) United States Patent
Jeong et al.

(10) Patent No.: US 12,014,164 B2
(45) Date of Patent: Jun. 18, 2024

(54) APPARATUS FOR PERFORMING OVER-THE-AIR (OTA) UPDATE FOR VEHICLE, AND METHOD THEREOF

(71) Applicants: Hyundai Motor Company, Seoul (KR); Kia Corporation, Seoul (KR)

(72) Inventors: Hyeok Sang Jeong, Gyeonggi-do (KR); Myeong Gyu Jeong, Seoul (KR); Jin Ah Kim, Gyeonggi-do (KR); Yoon Sik Jung, Seoul (KR); Hak Jun Kim, Gyeonggi-do (KR); Dong Youl Lee, Seoul (KR); Young Jee Yang, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 114 days.

(21) Appl. No.: 17/752,550

(22) Filed: May 24, 2022

(65) Prior Publication Data

US 2023/0047340 A1 Feb. 16, 2023

(30) Foreign Application Priority Data

Aug. 13, 2021 (KR) .......................... 10-2021-0107198

(51) Int. Cl.
| | |
|---|---|
| *H04L 67/12* | (2022.01) |
| *B60L 58/12* | (2019.01) |
| *G06F 8/65* | (2018.01) |
| *G06F 8/658* | (2018.01) |
| *G07C 5/00* | (2006.01) |
| *G06F 8/61* | (2018.01) |

(Continued)

(52) U.S. Cl.
CPC ................ *G06F 8/65* (2013.01); *B60L 58/12* (2019.02); *G07C 5/008* (2013.01); *B60W 2556/45* (2020.02); *G06F 8/61* (2013.01); *G06F 11/1433* (2013.01); *H04W 4/48* (2018.02)

(58) Field of Classification Search
CPC .......... G06F 8/65; G06F 8/61; G06F 11/1433; B60L 58/12; G07C 5/008; B60R 16/023; B60W 2556/45; H04W 4/48
See application file for complete search history.

(56) References Cited

U.S. PATENT DOCUMENTS

| | | |
|---|---|---|
| 9,274,786 B2 | 3/2016 | Ji |
| 10,956,147 B2 | 3/2021 | Kiyama et al. |

(Continued)

FOREIGN PATENT DOCUMENTS

| | | |
|---|---|---|
| KR | 101548953 B1 | 9/2015 |
| KR | 2021-0041972 A | 4/2021 |

OTHER PUBLICATIONS

Dennis K. Nilsson et al., Secure Firmware Updates over the Air in Intelligent Vehicles, 2008, [Retrieved on Feb. 20, 2024]. Retrieved from the internet: <URL: https://ieeexplore.ieee.org/stamp/stamp.jsp?tp=&arnumber=4531926> 5 Pages (380-384) (Year: 2008).*

(Continued)

*Primary Examiner* — Anibal Rivera
(74) *Attorney, Agent, or Firm* — Fox Rothschild LLP

(57) ABSTRACT

An apparatus for performing an over-the-air (OTA) update for a vehicle includes a display that displays at least one message for the OTA update of the vehicle, and a controller that generates the at least one message displayed based on at least one condition for the vehicle.

8 Claims, 5 Drawing Sheets

(51) Int. Cl.
　　　*G06F 11/14*　　　(2006.01)
　　　*H04W 4/48*　　　(2018.01)

(56) References Cited

U.S. PATENT DOCUMENTS

| | | | |
|---|---|---|---|
| 2015/0178067 A1 | 6/2015 | Ji | |
| 2019/0327131 A1* | 10/2019 | Conn | F16H 61/0213 |
| 2020/0174778 A1* | 6/2020 | David | H04W 4/80 |
| 2020/0174779 A1* | 6/2020 | David | G06F 8/654 |
| 2021/0157902 A1* | 5/2021 | Sakurai | B60R 16/0231 |

OTHER PUBLICATIONS

Kaneez Fizza et al., Faster OTA Updates in Smart Vehicles using Fog Computing, 2019, [Retrieved on Feb. 20, 2024]. Retrieved from the internet: <URL: https://dl.acm.org/doi/pdf/10.1145/3368235.3368842> 6 Pages (59-64) (Year: 2019).*

* cited by examiner

APPARATUS FOR PERFORMING OVER-THE-AIR (OTA) UPDATE FOR VEHICLE, AND METHOD THEREOF

CROSS-REFERENCE TO RELATED APPLICATION

This application claims under 35 U.S.C. § 119(a) the benefit of Korean Patent Application No. 10-2021-0107198, filed in the Korean Intellectual Property Office on Aug. 13, 2021, the entire contents of which are incorporated herein by reference.

BACKGROUND

(a) Technical Field

The present disclosure relates to an apparatus for performing an over-the-air (OTA) update for a vehicle, and a method thereof.

(b) Description of the Related Art

In general, an electric vehicle, a hybrid vehicle, a plug-in hybrid vehicle or the like may be driven by a battery included in the vehicle. An over-the-air (OTA) update of a controller included in the vehicle described above may also be performed based on the battery included in the vehicle. However, the OTA update of the vehicle may be incompletely performed when the OTA update is performed without fully checking a vehicle battery state or a vehicle state in advance.

In addition, the OTA update may be incompletely performed when a vehicle user is not notified of the vehicle state that may be resolved by an operation of the user, before the OTA update is performed.

SUMMARY

An aspect of the present disclosure provides an apparatus or method capable of checking a vehicle battery state before performing an over-the-air (OTA) update of the vehicle, and notifying a vehicle user of the checked battery state.

Another aspect of the present disclosure provides an apparatus or method capable of checking a vehicle state before performing the OTA update of the vehicle, and notifying the vehicle user of the vehicle state.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for performing an over-the-air (OTA) update for a vehicle includes a display that displays at least one message for the OTA update of the vehicle, and a controller that generates the at least one message displayed based on at least one condition for the vehicle.

In addition, the at least one message may include at least one of a first message for receiving approval for starting the OTA update, a second message for indicating a first condition for the OTA update or a third message for indicating that the OTA update is in preparation.

In addition, the first message may be generated when a second condition for the OTA update is satisfied in a state where ignition power of the vehicle is turned off.

In addition, the second condition may include at least one of the following conditions: constant power of the vehicle is turned on, the vehicle is able to perform a radio communication, a state of charge (SOC) of a low-voltage battery in the vehicle has a value greater than a predetermined first value, a SOC of a high-voltage battery in the vehicle has a value greater than a predetermined second value or the vehicle is not driven.

In addition, the first message may include at least one of information on an estimated time for completing the OTA update or information on a content to be updated by the OTA update.

In addition, the second message may be generated when a user inputs information approving start of the OTA update in a state where the first message is displayed.

In addition, the second message may include information on whether the first condition is satisfied.

In addition, the first condition may include at least one of the following conditions: the vehicle has a hood closed, a gear lever in a parking (P) position, a lamp turned off or a parking brake engaged.

In addition, the third message may be generated when the first condition is satisfied in a state where the second message is displayed.

In addition, the third message may further include information indicating that the first condition is satisfied.

According to another aspect of the present disclosure, a method of performing an over-the-air (OTA) update for a vehicle includes displaying, by a display, at least one message for the OTA update of the vehicle; and generating, by a controller, the at least one message displayed based on at least one condition for the vehicle.

In addition, the at least one message may include at least one of a first message for receiving approval for starting the OTA update, a second message for indicating a first condition for the OTA update or a third message for indicating that the OTA update is in preparation.

In addition, the first message may be generated when a second condition for the OTA update is satisfied in a state where ignition power of the vehicle is turned off.

In addition, the second condition may include at least one of the following conditions: constant power of the vehicle is turned on, the vehicle is able to perform a radio communication, a state of charge (SOC) of a low-voltage battery in the vehicle has a value greater than a predetermined first value, a SOC of a high-voltage battery in the vehicle has a value greater than a predetermined second value or the vehicle is not driven.

In addition, the first message may include at least one of information on an estimated time for completing the OTA update or information on a content to be updated by the OTA update.

In addition, the second message may be generated when a user inputs information approving start of the OTA update in a state where the first message is displayed.

In addition, the second message may include information on whether the first condition is satisfied.

In addition, the first condition may include at least one of the following conditions: the vehicle has a hood closed, a gear lever in a parking (P) position, a lamp turned off or a parking brake engaged.

In addition, the third message may be generated when the first condition is satisfied in a state where the second message is displayed.

In addition, the third message may further include information indicating that the first condition is satisfied.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
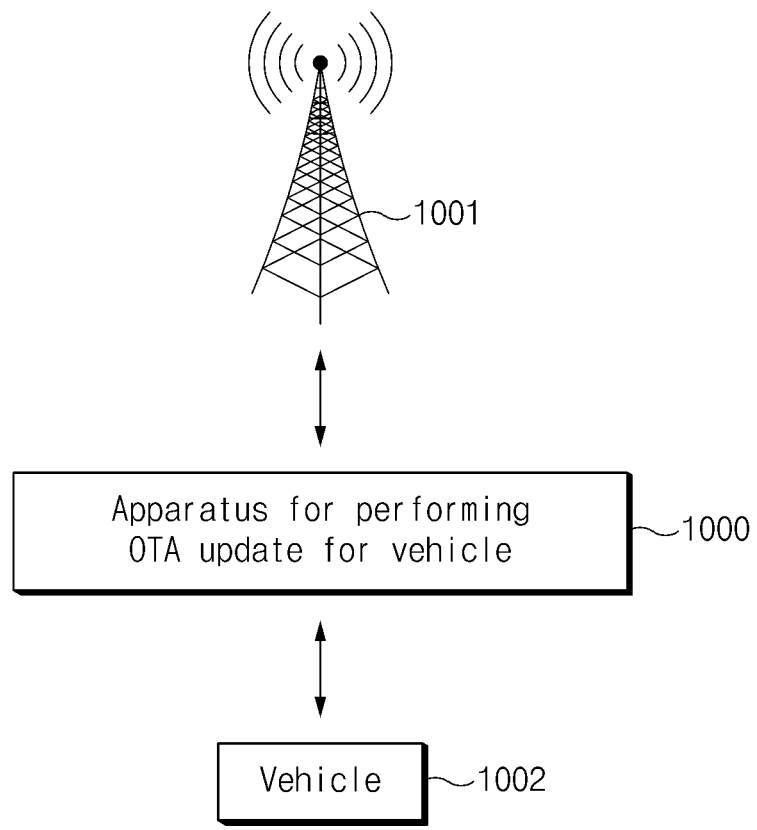
FIG. 1 shows an example of an environment in which an apparatus for performing an over-the-air (OTA) update for a vehicle is performed according to embodiments.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. In the drawings, the same reference numbers will be used throughout to designate the same or equivalent components. In addition, a detailed description of well-known features or functions will be ruled out in order not to unnecessarily obscure the gist of the present disclosure.

Terms 'first', 'second', A, B, (a), (b) and the like, may be used in describing components of embodiments of the present disclosure. These terms are only used in order to distinguish any components from other components, and features, sequences or the like of the corresponding components are not limited by these terms. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

Hereinafter, embodiments of the present disclosure are described in detail with reference to FIGS. 1 to 5.

FIG. 1 shows an example of an environment in which an apparatus for performing an over-the-air (OTA) update for a vehicle is performed according to embodiments of the present disclosure.

FIG. 1 shows an example of an environment in which an apparatus 1000 for performing the OTA update for the vehicle (or the apparatus 1000) according to embodiments is performed.

FIG. 1 shows that the apparatus is disposed outside the vehicle according to embodiments, but the apparatus may be disposed in the vehicle.

A vehicle 1002 according to embodiments may be at least one of an electric vehicle (EV), a hybrid electric vehicle (HEV) or a plug-in hybrid electric vehicle (PHEV).

The over-the-air (OTA) update according to embodiments may refer to a method of updating software of the vehicle by using a wireless communication network. In general, the software of the vehicle may be updated by connecting a storage apparatus storing data for the software update to the vehicle by wire. However, due to development of communication technology, the vehicle may directly receive and update the data required for the software update by using the wireless communication network.

The apparatus according to embodiments may receive information (or the data required for the software update) on the OTA update of the vehicle from a server 1001. The information on the OTA update according to embodiments may be information on performing the above-described OTA update. For example, the information on the OTA update may include information on a software package, information on a software version, and the like.

The apparatus according to embodiments may perform the OTA update of the vehicle, based on the information on the OTA update received from the server. That is, the apparatus may perform the OTA update by comparing the information on the OTA update received from the server and information on the software of the vehicle. For example, the apparatus may determine whether to perform the OTA update by comparing the information on a software version, received from the server, and the information on a software version of a controller included in the vehicle with each other.

The above-described vehicle according to embodiments may include one or more controllers. The controller according to embodiments may refer to an apparatus included in the vehicle to perform a specific function. For example, the controller may refer to an electronic control unit (ECU) included in the vehicle.

The OTA update according to embodiments may be performed for each of the above-described controllers. That is, the OTA update performed by the apparatus may be performed independently for each controller or collectively for all the controllers included in the vehicle.

The apparatus according to embodiments may wirelessly update software of the controller(s) included in the vehicle by using any of OTA update methods shown in the drawings. That is, the apparatus may update the software of the controller by using any of the OTA update methods to allow the controller to have a newly added function, fewer errors and/or enhanced security.

Figure 2:
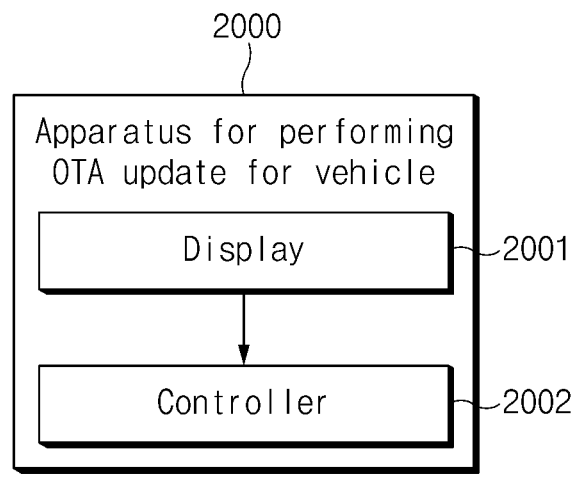
FIG. 2 shows an example of an apparatus for performing the OTA update for the vehicle according to embodiments.

FIG. 2 shows an example of an apparatus for performing the OTA update for the vehicle according to embodiments.

FIG. 2 is a block diagram showing an example of an apparatus 2000 for performing the OTA update for the vehicle (or the apparatus 2000) according to embodiments. The apparatus may correspond to the apparatus described above with reference to FIG. 1.

In general, the electric vehicle, the hybrid car, the plug-in hybrid car or the like may be driven by a battery included in the vehicle. The OTA update of the controller included in the vehicle described above may also be performed based on the battery included in the vehicle. However, the OTA update of the vehicle may be incompletely performed when the OTA update is performed without fully checking a vehicle battery state or a vehicle state in advance.

In addition, the OTA update may be incompletely performed when a vehicle user is not notified of the vehicle state that may be resolved by an operation of the user, before the OTA update is performed.

The apparatus according to embodiments may check the vehicle battery state before performing the OTA update of the vehicle, and may notify the vehicle user of the checked battery state. In addition, the apparatus according to embodiments may check the vehicle state before performing the OTA update of the vehicle, and may notify the user of the vehicle state that may be operated by the user.

The apparatus according to embodiments may include a display 2001 that displays at least one message for the OTA update of the vehicle and/or a controller 2002 that generates the at least one message displayed based on at least one condition for the vehicle. The apparatus according to embodiments may further include one or more elements not shown in FIG. 2.

The at least one message according to embodiments may be a message related to the above-described vehicle state and/or battery state, which is to be confirmed before performing the OTA update of the vehicle. The at least one message according to embodiments may be displayed on the display and shown to the user.

The at least one message according to embodiments may include at least one of a first message for receiving approval for starting the OTA update, a second message for indicating a first condition for the OTA update or a third message for indicating that the OTA update is in preparation. The description describes the first message to the third message according to embodiments in detail below with reference to FIG. 3.

The at least one condition according to embodiments may include a condition for the OTA update. The condition for the OTA update may indicate a condition required to be satisfied by the controller or battery of the vehicle to perform the above-described OTA update.

The at least one condition according to embodiments may include the first condition for the OTA update and/or a second condition for the OTA update. Both the first condition and the second condition for the OTA update may indicate the condition required to be satisfied by the controller or battery of the vehicle to perform the OTA update, and may indicate different conditions.

The description describes the first condition and the second condition according to embodiments in detail below with reference to FIG. 3.

The apparatus according to embodiments may check the vehicle state or the vehicle battery state by using the method described in the drawings, before performing the OTA update of the vehicle, and may notify a checked result to the vehicle user. The user may take an appropriate action to control the vehicle state and/or battery state, based on the notified check result. In this manner, the apparatus according to embodiments may perform the OTA update safely and completely.

Figure 3:
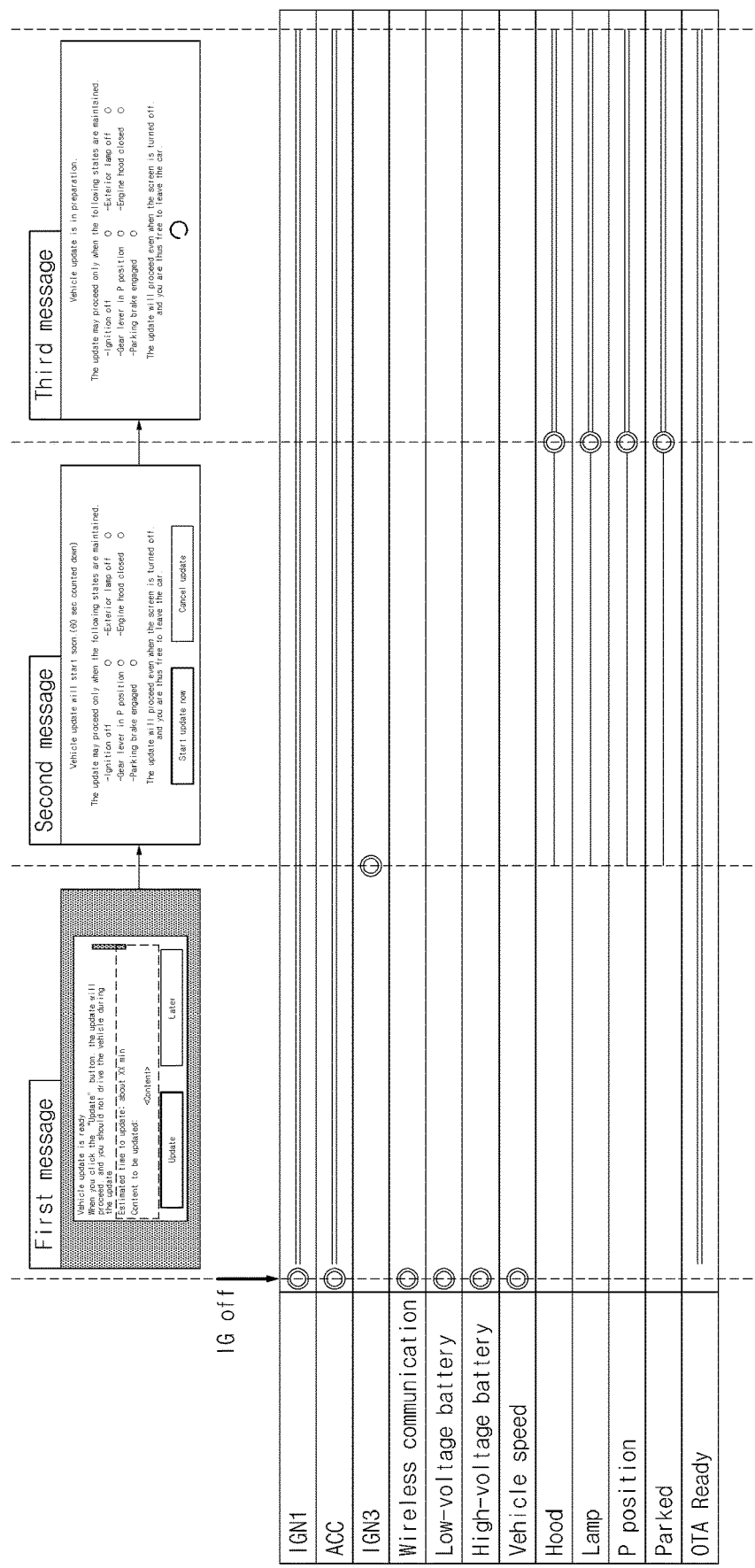
FIG. 3 shows examples of a first message to a third message according to embodiments.

FIG. 3 shows examples of a first message to a third message according to embodiments.

FIG. 3 shows the examples of the first message to the third message (i.e., the first message to the third message described above with reference to FIG. 2) according to embodiments.

As described above with reference to FIG. 2, the at least one message according to embodiments may include the first message for receiving the approval for starting the OTA update, the second message for indicating the first condition for the OTA update or the third message for indicating that the OTA update is in preparation.

In addition, as described above with reference to FIG. 2, the at least one message according to embodiments may be generated based on the at least one condition for the vehicle (i.e., the at least one condition described above with reference to FIG. 2).

Reference number 3000 may indicate the first message, reference number 3001 may indicate the second message and reference number 3003 may indicate the third message.

The first message according to embodiments may be a message for receiving the approval for starting the OTA update of the vehicle. That is, the apparatus may display the first message on the display to receive the approval of the user for starting the OTA update.

The first message may include at least one of information on an estimated time for completing the OTA update or information on a content to be updated by the OTA update. For example, the first message may include text information indicating, "Vehicle update is ready. When you click the "Update" button, the update will proceed, and you should not drive the vehicle during the update. Estimated time to update: about XX min., Content to be updated: <Content>."

As described above, the first message to the third message may be generated based on the at least one condition. The at least one condition may indicate a condition for displaying a next message shown in FIG. 3. The apparatus may continuously check the above-mentioned condition(s), and may cancel the OTA update when the condition(s) is/are not satisfied. In addition, in a certain condition, the apparatus may only monitor and display the vehicle state.

The first message may be generated when the second condition for the OTA update is satisfied in a state where ignition power of the vehicle is turned off.

Power of the vehicle according to embodiments may include the ignition power and/or constant power. The ignition power may be a power for starting the vehicle. The constant power may be a power that is turned on constantly regardless of whether the vehicle is started.

That is, the first message, which is the message for receiving the approval for starting the OTA update of the vehicle, may be generated when the second condition for the OTA update is satisfied in a state where the ignition power of the vehicle is turned off.

The second condition according to embodiments may include at least one of the following conditions: the constant power of the vehicle is turned on, the vehicle is able to perform a radio communication, a state of charge (SOC) of a low-voltage battery in the vehicle has a value greater than a predetermined first value, a SOC of a high-voltage battery in the vehicle has a value greater than a predetermined second value or the vehicle is not driven.

For example, as shown in FIG. 3, the first message may be generated when: the ignition of the vehicle is turned off, the constant power of the vehicle is turned on, the vehicle is able to perform the radio communication, the state of charge (SOC) of a low-voltage battery in the vehicle has the value greater than the predetermined first value, the SOC of a high-voltage battery in the vehicle has the value greater than the predetermined second value or the vehicle is not driven.

The second message may be generated when the user inputs information approving start of the OTA update in a state where the first message is displayed. The user may input the information approving the start of the OTA update by clicking the "Update" button included in the first message.

As described above, the second message may be a message for indicating the first condition for the OTA update. That is, the second message may include information on whether the first condition is satisfied. For example, the second message may include text information indicating, "Vehicle update will start soon (60 sec. counted down). The update may proceed only when the following states are maintained.—Ignition off (O),—Exterior lamp off (O),—Gear lever in P position (O),—Engine hood closed (O),—Parking brake engaged (O). The update will proceed even when the screen is turned off, and you are thus free to leave the car."

The first condition for the OTA update according to embodiments may indicate a condition that is necessary for the OTA update to be performed. The first condition may include at least one of the following conditions: the vehicle has the hood closed, the gear lever in the parking (P) position, the lamp turned off or the parking brake engaged.

For example, the apparatus may display one or more conditions included in the first condition on the display by using the second message when the first message is displayed and the user inputs the information approving the start of the OTA update. The user may control the vehicle state to satisfy one or more conditions included in the second message displayed on the display. For example, the user may recognize that the vehicle engine hood is opened by the second message displayed on the display.

That is, the apparatus may monitor whether the second condition is satisfied in a state where the second message is displayed on the display, and may display the vehicle state on the display.

The third message according to embodiments may be a message for indicating that the OTA update is in preparation. The third message may be generated when the first condition is satisfied in a state where the second message is displayed.

That is, the third message may be generated when all items of the above first condition are satisfied by the user. The third message may further include information indicating that the first condition is satisfied. For example, the third message may include text information indicating, "Vehicle update is in preparation. The update may proceed only when the following states are maintained.—Ignition off (O),—Exterior lamp off (O),—Gear lever in P position (O),—Engine hood closed (O),—Parking brake engaged (O). The update will proceed even when the screen is turned off, and you are thus free to leave the car."

The apparatus according to embodiments may perform the OTA update of the vehicle when a predetermined time is over after the third message is displayed on the display.

The apparatus according to embodiments may check the vehicle state or the vehicle battery state by using the method described in the drawings, before performing the OTA update of the vehicle, and may notify the checked result to the vehicle user. The user may take the appropriate action to control the vehicle state and/or battery state, based on the notified check result. In this manner, the apparatus according to embodiments may perform the OTA update safely and completely.

Figure 4:
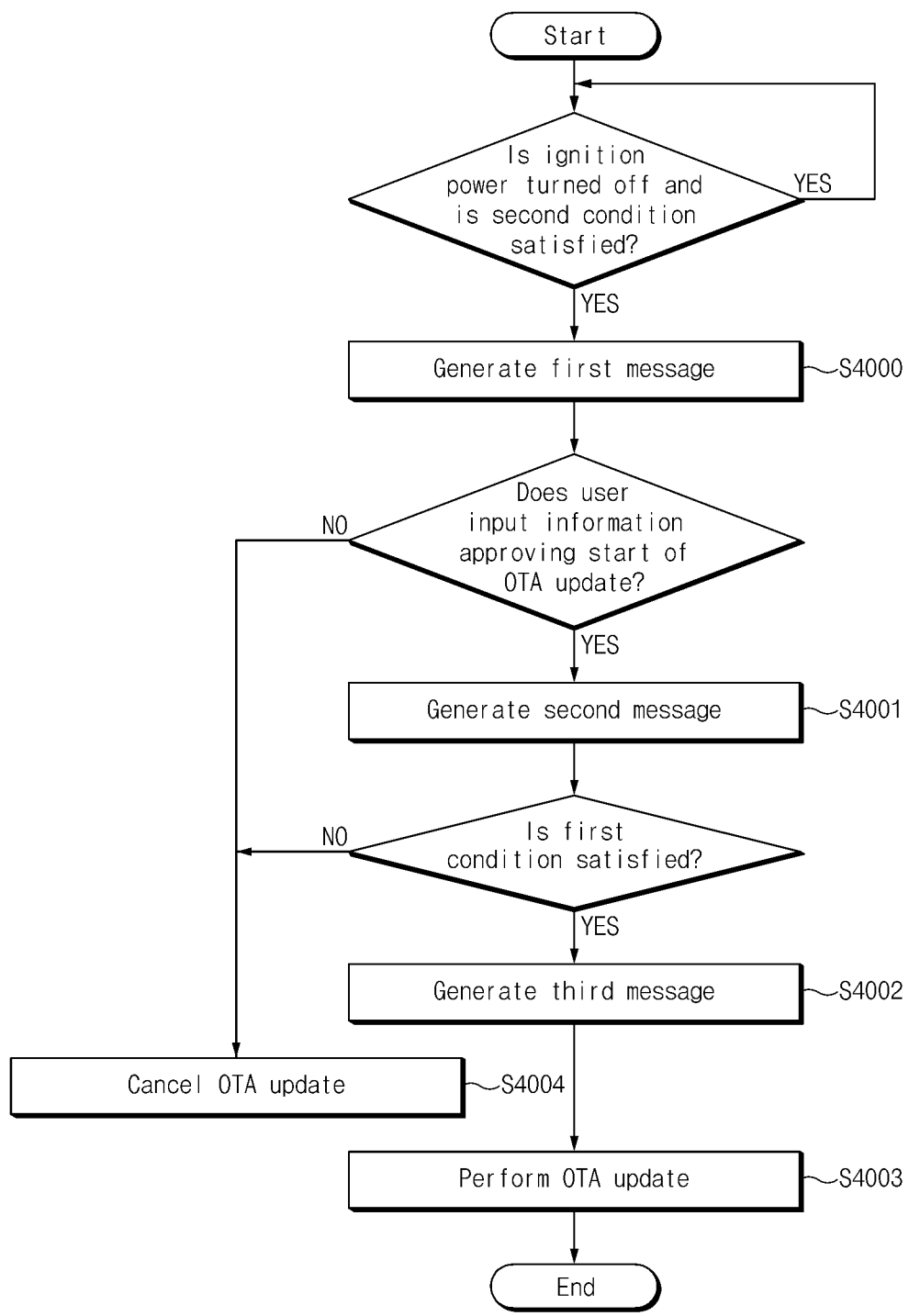
FIG. 4 shows an example of a method of performing an over-the-air (OTA) update for a vehicle according to embodiments.

FIG. 4 shows an example of a method of performing an over-the-air (OTA) update for a vehicle according to embodiments.

FIG. 4 shows the example of the method of performing the OTA update for the vehicle (or the method) according to embodiments. The apparatus described above with reference to FIGS. 1 to 3 may perform the method described in FIG. 4.

A controller (i.e. the controller described above with reference to FIG. 2) according to embodiments may generate a first message when a second condition for the OTA update is satisfied in a state where ignition power of the vehicle is turned off (S4000). Detailed descriptions of the ignition power and the second condition for the OTA update may be the same as or similar to those described above with reference to FIG. 3.

The controller may generate a second message when a user inputs information approving start of the OTA update in a state where the first message is displayed (S4001). Detailed descriptions of the information approving the start of the OTA update and the second message may be the same as or similar to those described with reference to FIG. 3.

The controller may cancel the OTA update of the vehicle when the user does not input the information approving the start of the OTA update even though the first message is displayed (S4004).

The controller may generate a third message when the first condition is satisfied in a state where the second message is displayed (S4002). As described above with reference to FIG. 3, the controller may perform the OTA update when a predetermined time is over after the third message is generated and displayed (S4003). Detailed descriptions of the first condition and the third message may be the same as or similar to those described above with reference to FIG. 3.

The controller may cancel the OTA update of the vehicle when the first condition is not satisfied even though the second message is displayed (S4004). However, although not shown in FIG. 4, the OTA update of the vehicle may be performed when the first condition is satisfied again by the user after the OTA update is canceled.

The apparatus according to embodiments may check a vehicle state or a vehicle battery state by using the method described in FIG. 4 before performing the OTA update of the vehicle, and may notify a checked result to the vehicle user. The user may take an appropriate action to control the vehicle state and/or battery state, based on the notified check result. In this manner, the apparatus according to embodiments may perform the OTA update safely and completely.

Figure 5:
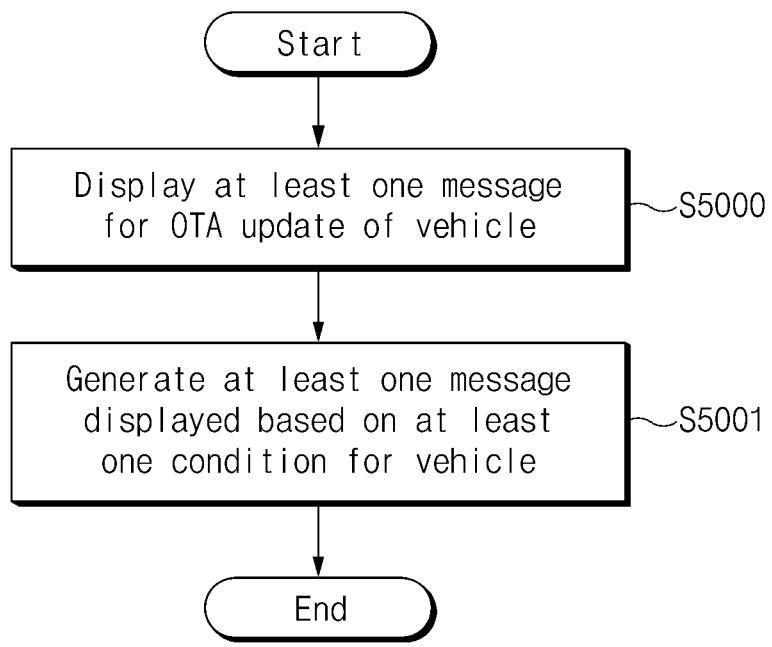
FIG. 5 shows another example of the method of performing the OTA update for the vehicle according to embodiments.

FIG. 5 shows another example of the method of performing the OTA update for the vehicle according to embodiments.

FIG. 5 is a flowchart showing another example of the method of performing the OTA update for the vehicle (or method) according to embodiments. The apparatus described above with reference to FIGS. 1 to 4 may perform the method described in FIG. 5.

The method according to embodiments may include displaying at least one message for the OTA update of the vehicle (S5000) and generating at least one message displayed based on at least one condition for the vehicle (S5001). The method may further include one or more steps not shown in FIG. 5.

The at least one message according to embodiments may include at least one of the first message for receiving approval for starting the OTA update, the second message for indicating the first condition for the OTA update or the third message for indicating that the OTA update is in preparation.

The first message may be generated when the second condition for the OTA update is satisfied in a state where the ignition power of the vehicle is turned off.

The second condition according to embodiments may include at least one of the following conditions: constant power of the vehicle is turned on, the vehicle is able to perform a radio communication, a state of charge (SOC) of a low-voltage battery in the vehicle has a value greater than a predetermined first value, a SOC of a high-voltage battery in the vehicle has a value greater than a predetermined second value or the vehicle is not driven.

The first message according to embodiments may include at least one of information on an estimated time for completing the OTA update or information on a content to be updated by the OTA update.

The second message may be generated when the user inputs the information approving the start of the OTA update in a state where the first message is displayed.

The second message according to embodiments may include information on whether the first condition is satisfied.

The first condition according to embodiments may include at least one of the following conditions: the vehicle has a hood closed, a gear lever in a parking (P) position, a lamp turned off or a parking brake engaged.

The third message according to embodiments may be generated when the first condition is satisfied in a state where the second message is displayed.

The third message according to embodiments may further include information indicating that the first condition is satisfied.

The descriptions of the above-described OTA update, at least one message, at least one condition, first message, second message, third message, first condition and second condition may be the same as or similar to those described above with reference to FIGS. 1 to 4.

The apparatus according to embodiments may check the vehicle state or the vehicle battery state by using the method described in FIG. 5 before performing the OTA update of the vehicle, and may notify the checked result to the vehicle user. The user may take the appropriate action to control the vehicle state and/or battery state, based on the notified check result. In this manner, the apparatus according to embodiments may perform the OTA update safely and completely.

In embodiments, it is possible to check the vehicle battery state before performing the OTA update of the vehicle, and to notify the user of the checked battery state.

In embodiments, it is also possible to check the vehicle state before performing the OTA update of the vehicle, and to notify the user of the vehicle state that may be operated by the user.

In addition, there may be a variety of effects identified directly or indirectly from the present disclosure.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for performing an over-the-air (OTA) update for a vehicle, the apparatus comprising:
    a display included in the vehicle and configured to display at least one message for the OTA update of the vehicle; and
    a controller included in the vehicle to perform a specific function and including a processor, wherein the controller is configured to:
        generate first message for display when a second condition for the OTA update is satisfied in a state where ignition power of the vehicle is turned off:
        generate a second message for display, including information on whether a first condition for the OTA update is satisfied, when a user inputs information approving start of the OTA update in a state where the first message is display:
        generate a third message for display including information indicating that the first condition is satisfied when the first condition is satisfied in a state where the second message is displayed:
        perform the OTA update when a predetermined time elapses after the third message is displayed; and
        cancel the OTA update when the first condition is not satisfied even though the second message is displayed.

2. The apparatus of claim 1, wherein the second condition includes at least one of the following conditions: constant power of the vehicle is turned on, the vehicle is able to perform a radio communication, a state of charge (SOC) of a low-voltage battery in the vehicle has a value greater than a predetermined first value, a SOC of a high-voltage battery in the vehicle has a value greater than a predetermined second value, or the vehicle is not driven.

3. The apparatus of claim 1, wherein the first message includes at least one of information on an estimated time for completing the OTA update or information on a content to be updated by the OTA update.

4. The apparatus of claim 1, wherein the first condition includes at least one of the following conditions: the vehicle has a hood closed, a gear lever in a parking (P) position, a lamp turned off, or a parking brake engaged.

5. A method of performing an over-the-air (OTA) update for a vehicle, the method comprising:
- when a second condition for the OTA update is satisfied in a state where ignition power of the vehicle is turned off, generating, by a controller included in the vehicle to perform a specific function, a first message;
- displaying, by a display, the first message;
- when a user inputs information approving of the OTA update in a state where the first message is displayed, generating, by the controller, a second message for display including information on whether a first condition for the OTA update is satisfied;
- displaying, by the display, the second message
- when the first condition is satisfied in a state where the second message is displayed, generating, by the controller, a third message for display including information indicating that the first condition is satisfied;
- displaying, by the display, the third message;
- performing, by the controller, the OTA update when a predetermined time elapses after the third message is displayed; and
- canceling, by the controller, the OTA update when the first condition is not satisfied even though the second message is displayed.

6. The method of claim 5, wherein the second condition includes at least one of the following conditions: constant power of the vehicle is turned on, the vehicle is able to perform a radio communication, a state of charge (SOC) of a low-voltage battery in the vehicle has a value greater than a predetermined first value, a SOC of a high-voltage battery in the vehicle has a value greater than a predetermined second value, or the vehicle is not driven.

7. The method of claim 5, wherein the first message includes at least one of information on an estimated time for completing the OTA update or information on a content to be updated by the OTA update.

8. The method of claim 5, wherein the first condition includes at least one of the following conditions: the vehicle has a hood closed, a gear lever in a parking (P) position, a lamp turned off or a parking brake engaged.

\* \* \* \* \*